United States Patent

Shimomura

[15] 3,699,190

[45] Oct. 17, 1972

[54] METHOD FOR PREPARING BLOCK COPOLYMER

[72] Inventor: Takatoshi Shimomura, Toyonaka, Japan

[73] Assignee: Sumitomo Chemical Company, Limited, Osaka, Japan

[22] Filed: Nov. 2, 1970

[21] Appl. No.: 86,353

[30] Foreign Application Priority Data

Nov. 20, 1969 Japan ..................... 44/93439

[52] U.S. Cl. ............... 260/877, 260/878 B, 260/879, 260/880 B, 260/885, 260/886
[51] Int. Cl. ....... C08f 15/02, C08f 19/04, C08f 45/68
[58] Field of Search....... 260/878 B, 886, 880 B, 885, 260/879, 877

[56] References Cited

OTHER PUBLICATIONS

Reich and Schindler, " Polymerization by Organometallic Compounds," pp. 701– 702, Interscience, New York (1966) QD281.P6R38C.2.
Cash, abstract of S.N. 746,313, filed 7/22/68, published in 866 O.G. 22, on 9/2/69. (T866,006 – 260/878B).
Shields et al, abstract of S.N. 657,707, filed 8/1/67, published 866 O.G. 701, on 9/16/69. (T866,013 – 260/878B).

*Primary Examiner*—James A. Seidleck
*Assistant Examiner*—A. Holler
*Attorney*—Stevens, Davis, Miller & Mosher

[57] ABSTRACT

A block copolymer composed of a polymer block of an anionically polymerizable conjugated vinyl compound and a polymer block of a coordination-anionically polymerizable monomer is produced by polymerizing a conjugated vinyl compound giving a stable carbanion, such as for example, a monovinyl aromatic compound, a vinylpyridine, a methacrylic acid ester, a vinylketone, or a conjugated diene, in a solvent using as a catalyst an alkali metal, an organolithium compound or an aromatic hydrocarbon-alkali metal complex, thereby obtaining a living polymer, treating the said living polymer with a metal halide or an organometallic halide represented by the general formula, $MR_{p-n}X_n$ (wherein M is a metal of Group II or III of Mendeleev's Periodic Table, R is a hydrocarbon residue having one to 20 carbon atoms, X is a halogen atom, $p$ is the valency of M, and $n$ is an arbitrary number of higher than 0 but lower than 3 to synthesize a polymer containing on its chain end(s) a linkage of carbon to a metal of Group II or III of Mendeleev's Periodic Table, and then contacting a coordination-anionically polymerizable monomer with a catalyst consisting of the above-mentioned polymer and a compound of a transition metal of Group IV, V or VI of Mendeleev's Periodic Table.

Block copolymers obtained according to the above-mentioned process are white powders and can be made into various molded and shaped articles by use of such thermoplastic resin-processing means as injection molding, compression molding, blow molding, fiber extrusion or film extrusion means.

16 Claims, No Drawings

METHOD FOR PREPARING BLOCK COPOLYMER

This invention relates to a process for producing a block copolymer which comprises block copolymerizing a coordination-anionically polymerizable monomer with a catalyst consisting of a polymer containing on its chain end(s) a carbon-metal linkage, said metal being of Group II or III of Mendeleev's Periodic Table, and a compound of a transition metal of Group IV, V, or VI of Mendeleev's Periodic Table.

For synthesizing a block copolymer, there are various methods which generally belong, in principle, to either of the following two categories: one includes methods in which the active terminal of a polymer is utilized to polymerize the second and the third monomers, and the other includes those which utilizes mutual reaction between the terminal groups of different polymers.

Attempts have long been made to synthesize a block copolymer according to a single polymerization mechanism by adding two or more monomers sequentially to the living anionic active chain end or the coordination-anionic active chain end. However, it is difficult to expect propagation reactions according to different polymerization mechanisms on the same polymer chain, and, therefore, there have been known no cases where monomers with different polymerizability were block-copolymerized on the same polymer chain.

The present inventor has found a novel process for producing block copolymers, characterized in that the polymerization of a coordination-anionically polymerizable monomer is effected using as a catalyst a polymer synthesized in such a manner that a living polymer or copolymer (hereinafter referred to as "living polymer") having an alkali metal bonded to the polymer chain end is treated first with a compound of a metal of Group II or III of Mendeleev's Periodic Table to form a polymer having a metal-carbon linkage at its active chain end, and then treated with a transition metal compound IV, V or VI of Mendeleev's Periodic Table to create a Ziegler-Natta-type active site for coordination-anionic polymerization.

Based on said finding, the present invention has been accomplished.

According to the present invention, there is provided a process for producing a block copolymer which comprises block-copolymerizing a coordination-anionically polymerizable monomer with a catalyst consisting of a polymer containing on its chain end a metal-carbon linkage, which is obtained by reacting a living polymer with a metal halide or an organometallic halide represented by the formula, $MR_{p-n}X_n$, wherein M is a metal of Group II or III of Mendeleev's Periodic Table, R is a hydrocarbon residue having one to 20 carbon atoms, X is a halogen atom such as, for example, F, Cl, Br or I, $p$ is the valency of M, and $n$ is an arbitrary number of higher than 0 but lower than 3 and a compound of a transition metal of Group IV, V, or VI of Mendeleev's Periodic Table.

The living polymer used in this invention for producing the block copolymer is obtained, as is well known, by polymerizing in solution a conjugated vinyl compound capable of giving a stable carbanion, using as a catalyst an alkali metal, an organolithium compound or an aromatic hydrocarbon-alkali metal complex. The living polymer obtained according to such a polymerization reaction has, in general, an alkali atom bonded to the chain end.

As the conjugated vinyl compound giving a stable carbanion which constitutes the living polymer, there may be used any compound of this kind so far as it is anionically polymerizable. Specific examples of such conjugated vinyl compounds include, for example, monovinyl aromatic compounds such as styrene αmethylstyrene, vinyltoluene and vinylnaphthalene; vinylpyridines such as 2-vinylpyridine and 4-vinylpyridine; acrylic esters such as methyl acrylate and ethyl acrylate; methacrylic esters such as methyl methacrylate and ethyl methacrylate; and conjugated dienes such as butadiene and isoprene. These monomers are not only used each alone to produce a polymer composed of a single monomer, but also used in combination of two or more to produce a copolymer composed of two or more monomers.

The living polymers are preferably prepared in the presence of a solvent. Preferable examples of the solvents are aliphatic and cycloaliphatic hydrocarbons such as pentane, hexane, cyclohexane, tetrahydronaphthalene and the like; aromatic hydrocarbons such as benzene, toluene, xylene and the like; and ethers such as dioxane, tetrahydrofuran, 1,2-dimethoxyethane and the like. These solvents should be inactive to both the living polymer and various metal compounds added to the polymerization system.

The above-mentioned conjugated vinyl compounds and solvents require removal, prior to polymerization reaction, of impurities which react with alkali metals or carbanions. However, the presence of a small amount of impurities is not fatal, though the catalyst is, as much, consumed by the impurities.

The polymerization temperature used in preparing a living polymer may be suitably selected within the range of from $-78°$ C. to the boiling point of the solvent used. The chain length and molecular weight distribution of the living polymer can be controlled as required, by suitably selecting polymerization conditions such as a weight ratio of catalyst to monomer, a polymerization temperature, and the like.

The catalyst material is usually employed in amounts corresponding to from 0.00001 to 0.04 gram molecular proportion of the catalyst per gram molecular equivalent proportion of the monomer to be polymerized.

When the type of catalyst is suitably selected, it is possible to selectively synthesize either a one-ended or a two-ended living polymer. For example, a one-ended living polymer can be synthesized by using as catalyst an organometallic lithium or cumyl potassium, while a two-ended living polymer can be synthesized by using as catalyst an alkali metal or an aromatic hydrocarbon-alkali metal complex.

Thus, various living polymers different in monomeric constituent, degree of polymerization and molecular weight distribution can be obtained by varying the kind of conjugated vinyl compounds, the kind of catalysts, the weight ratio of catalyst to monomer and the polymerization conditions, and the resulting living polymers greatly affect the physical properties of block copolymers.

As the metal halides or the organometallic halides represented by the formula, $MR_{p-n}X_n$, which react with the living polymers in this invention, there may be used, for example, magnesium chloride, butylmagnesium chloride, phenylmagnesium bromide, dipropylaluminum fluoride, diisobutylaluminum fluoride, aluminum chloride, dimethylaluminum chloride, ethylaluminum dichloride, sesquiethylaluminum chloride, diethylaluminum chloride, dihexylaluminum chloride, diethylaluminum bromide, etc. Among these, dialkylaluminum chlorides are particularly preferable.

These metal halides or organometallic halides react with a living polymer at their halogen atoms to be bonded to the terminals of a living polymer through formation of carbon-to-metal linkages. When a halide having two or more halogen atoms is used in the reaction, two or more living polymer molecules are sometimes combined with the single metal atom.

In reacting the living polymer with the halide, the molar ratio between the two reactants is one of the important factors in the present invention, and has a great influence upon the ability of initiating subsequent coordination-anionic polymerization and, furthermore, upon the mechanical properties of the resulting block copolymer.

In both cases of one-ended and two-ended living polymers, the molar ratio of the halide to one mole of the living polymer is preferably 1.00 to 1.20 for a monohalide, 0.50 to 0.60 for a dihalide, and 0.35 to 0.40 for a trihalide; in other words, it is preferable to use the halide in slight excess of equivalent.

The reaction of a living polymer with a metal halide or an organometallic halide is effected by adding the halide to the polymerization system immediately after completion of the living polymerization of a conjugated vinyl compound. Since the reaction rate is extremely high, a reaction time of several minutes to 30 minutes is sufficient. The reaction can be effected at any temperature at which the living polymerization is effected, namely, at a temperature within the range of $-78°C$. to the boiling point of the solvent, though it is preferable to effect the reaction at a temperature suitable for maintaining a satisfactory rate of reaction.

The transition metal compound used in the present process is a compound of a metal of Group IV, V, or VI of Mendeleev's Periodic Table, such, for example, as compounds of titanium, zirconium, hafnium, vanadium, niobium, tantalum, chromium, molybdenum, tungsten. Among these, particularly advantageous compounds are those of titanium, zirconium and chromium. Suitable compounds of the above-mentioned metals are halides such, for example, as chlorides or bromides; oxyhalides such as acid chlorides; complex halides such as complex fluorides; freshly precipitated oxides or hydroxides; organic compounds such as alcoholates, acetates, benzoates, or acetylacetonates. As examples of these compounds there may be mentioned titanium tetrachloride, titanium trichloride, zirconium tetrachloride, tetrabutyl titanate, vanadium oxyacetylacetonate, chromium acetylacetonate, etc.

Although the details of reaction mechanism between the polymer containing on its chain end a carbon-metal linkage and the transition metal compound are not clear, it cannot be denied that the occurrence of said reaction favors the block copolymerization described hereunder.

The time required for the formation and subsequent ageing of the novel polymeric coordination-anionic polymerization catalyst from the above-mentioned polymer and a transition metal compound is from several minutes to several hours. The reaction is suitably effected at a temperature of $-78°$ C. to the boiling point of the solvent.

The molar ratio of the polymer containing on its chain end a metal-carbon linkage to the transition metal compound may be varied in a wide range, but a preferable range is from $1 : 1$ to $10 : 1$, in general. These procedures give serious influences to the block copolymerization described hereinafter. Therefore, the reaction conditions should be fixed with sufficient care.

The novel polymeric coordination-anionic polymerization catalyst used in this invention can readily initiate the polymerization of a coordination-anionically polymerizable monomer, and the latter is block-polymerized at the end of the polymer that constitutes the catalyst.

As the coordination-anionically polymerizable monomer subjected to such a block copolymerization, there may be used ethylenically unsaturated hydrocarbons and mixtures thereof, such, for example, as hydrocarbons having a vinyl, vinylidene or vinylene group. The present process is particularly important in the case of polymerization of a monoethylenically unsaturated hydrocarbon having a vinylidene group as the unsaturated group, which is represented by the formula,

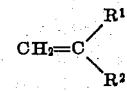

(wherein $R^1$ is alkyl having one to 15 carbon atoms and $R^2$ is alkyl having one to 15 carbon atoms, cycloalkyl having three to six carbon atoms, aryl having six to 10 carbon atoms, aralkyl having six to 15 carbon atoms, or alkaryl having six to 15 carbon atoms), and polymerization of a compound having a vinyl group as the unsaturated group, which is represented by the formula $CH_2 = CHR^3$ (wherein $R^3$ is hydrogen, alkyl having one to 15 carbon atoms, cycloalkyl having three to six carbon atoms, aryl having six to 10 carbon atoms, alkaryl having six to 15 carbon atoms, or aralkyl having six to 15 carbon atoms), and in the case of polymerization of a polyethylenically unsaturated hydrocarbon. Examples of the polymerizable ethylenically unsaturated hydrocarbons are straight chain 1-olefins such as ethylene, propylene, butene-1, pentene-1, hexene-1, heptene-1, octene-1, and the like; branched-chain 1-olefins and other olefins such as isobutylene, cis-butene, diisobutylene, tert-butylethylene, 4- and 5-methylheptene-1, and tetramethylethylene; substituted derivatives of styrene such as styrene, $\alpha$-methylstyrene, and vinylcyclohexane; diolefins such as hexadiene-1,4 and 6-methylheptadiene-1,5; conjugated diolefins such as butadiene, isoprene, and pentadiene-1,3; and cyclic olefins such as cyclopentadiene, cyclohexane, 4-vinylcyclohexene-1, and $\beta$-pinene.

The polymerization of these ethylenically unsaturated hydrocarbons which are subjected to the block copolymerization can be effected in various ways.

The molar ratio of the polymer containing on its chain end a metal-carbon linkage to the coordination-anionically polymerizable monomer is varied in a wide range, but a preferable range is from 1 : 10 to 1 : 10,000, in general.

The temperature, time and pressure for the block copolymerization may be varied depending upon the kind of monomer used. The polymerization temperature is within the range of −78°C. to 200°C., preferably −20°C. to 100°C.

The pressure used in the block copolymerization ranges from partial vacuum to about 500 atmospheres, preferably from atmospheric pressure to 100 atmospheres. A higher pressure can be used but does not appreciably affect the progress of block copolymerization.

In the present process, the block copolymerization of a coordination-anionically polymerizable monomer proceeds quantitatively, and the proportion of the monomer block copolymerized to the polymer containing on its chain end a carbon-metal linkage is ordinarily 80 percent or more and, under optimum conditions, the proportions becomes practically 100 percent. It is often unnecessary to isolate the block copolymer from the homopolymer of coordination-anionically polymerizable monomer and homopolymer of anionically polymerizable conjugated vinyl compound that has not taken part in the block copolymerization. However, when it is necessary to isolate the block copolymer in a pure form, the block copolymer can be selectively extracted with a suitable solvent, or otherwise, other two homopolymers can be removed by extraction with suitable solvents.

According to the process of this invention, as explained above, a block copolymer composed of an anionically polymerizable monomer and a coordination-anionically polymerizable monomer is readily obtained, and there is available a polymer with improved processability or improved physical properties, or a novel polymer with unique properties which have heretofore never realized.

The present invention is also characterized in that the transformation of propagation mechanism in the main chain of the same polymer is made possible.

The block copolymer obtained by the present process is a white powder and can be processed by means of thermoplastic processing machines for injection molding, compression molding, blow molding, fiber-extrusion, film-extrusion, etc., to obtain a variety of useful products.

The present invention is further illustrated in more detail below with reference to Examples, but is not limited thereto.

EXAMPLE 1

500 milliliters of toluene, dehydrated and purified in an ordinary way, and 40 ml of styrene, dehydrated and dried over calcium hydride, were charged into a glass reactor by direct distillation from each reservoir under a reduced pressure of less than $10^{-2}$ mmHg. Then, 2 ml of a cyclohexane solution containing 0.0036 mole of n-butyllithium was added to the system by means of a syringe through a self-sealing rubber stopper fitted to the reactor. The styrene was allowed to polymerize at room temperature while being stirred with a magnetic stirrer for 6 hours. Under these conditions the styrene was found to be completely consumed. Thus, there was obtained a toluene solution of polystyrene having a polymerization degree of about 1,000 and containing lithium atom bonded to one end of each polymer chain. After the polymerization of styrene was completed, a dry nitrogen was admitted into the reactor by way of a three-way stopcock attached thereto. Then, under the nitrogen atmosphere 0.0036 mole of diethylaluminum chloride was added into the reactor, and reaction was allowed to proceed under predetermined conditions: at room temperature for 10 minutes. In said ten minutes, the red color of polystyrene had faded away. Subsequently, to the reaction mixture was added 0.0018 mole of titanium tetrachloride, and the whole mixture was allowed to stand for 10 minutes at room temperature. The color of the reaction mixture had turned brownish black instantly upon addition of the titanium tetrachloride. Then, 70 ml of isoprene was added to the reaction mixture under a nitrogen atmosphere, and block copolymerization was allowed to proceed at 100° C. for 7 hours. After completion of the block copolymerization, the liquid reaction mixture was poured into a large excess of methanol to recover the polymerizate, which was vacuum-dried to yield 60 g. of a white powder. An attempt was made to extract with boiling acetone any polystyrene which had not been able to form the block copolymer. However, since almost none of polystyrene was obtained by said fractional extraction, it was concluded that practically all of the polystrene used had formed the block copolymer. Therefore, it was presumed that the extraction residue was a block copolymer of styrene and isoprene, which seemed to contain a small amount of polyisoprene.

EXAMPLE 2

Block copolymerization of pentene-1 and polystyrene was carried out by use of the polystyrene having coordination anionic polymerization active site on the terminal carbon atom at one end of each polymer chain, which was synthesized and prepared in entirely the same manner as in Example 1. Using 65 ml of pentene-1, the reaction was conducted in a reactor under a nitrogen stream at 87° C. for 8 hours. After completion of the block copolymerization the liquid reaction mixture was poured into a large excess of methanol to recover the polymerizate, which was vacuum-dried to obtain 62 g. of a white polymer. Said polymer was extracted with boiling acetone to remove any polystyrene that had not formed the block copolymer. From the extract, 3 g. of polystyrene was recovered. Therefore, more than 90 percent of the polystyrene used were believed to have had formed the block copolymer. The block copolymer of styrene and pentene-1 obtained as the extraction residue seemed to contain a small amount of polypentene-1.

EXAMPLE 3

700 milliliters of toluene, dehydrated and purified in an ordinary way, and 30 ml of 2-vinylpyridine, dehydrated and dried over calcium hydride, were charged into a glass reactor by direct distillation from each reservoir under a reduced pressure of less than $10^{-2}$ mmHg. Then, 2 ml of a cyclohexane solution containing 0.0036 mole of n-butyllithium was added to the system by means of a syringe through a self-sealing rubber stopper fitted to the reactor. The polymerization of 2-vinylpyridine was conducted at room temperature for 10 hours. Under these conditions the conversion of 2-vinylpyridine was 100 percent. Subsequently, dry nitrogen was admitted into the reactor by way of a three-way stopcock attached thereto. Then, under the nitrogen atmosphere 0.0036 mole of diethylaluminum chloride was added into the reactor, and reaction was allowed to proceed under predetermined conditions: at room temperature for 30 minutes. Then to the reaction mixture was added 0.0018 mole of titanium tetrachloride, and the whole mixture was allowed to stand for 10 minutes at room temperature. Said reaction mixture had turned brownish black instantly upon addition of the titanium tetrachloride. Then, 70 ml. of styrene was added to the reaction mixture under a nitrogen atmosphere, and block copolymerization was allowed to proceed at 100° C. for 7 hours. After completion of the block copolymerization, the liquid reaction mixture was freed from volatile matters such as solvent and unreacted monomer under vacuum till dryness, to obtain 53 g. of a yellow polymer. From said crude product, there were separated 2.7 g. of polystyrene by extraction with boiling ether, and 5.0 g. of poly-2-vinylpyridine by extraction with boiling ethanol. The crude product was further treated with tetrahydrofuran to yield 44.2 g. of the block copolymer. The extraction residue weighed about one gram, which seemed to be catalyst fragments. From the above results it was found that nearly 90 percent of the reaction product were block copolymer.

EXAMPLE 4

700 milliliters of toluene, dehydrated and purified in an ordinary way, and 40 ml. of methyl methacrylate, dehydrated and dried over calcium hydride, were charged into a glass reactor by direct distillation from each reservoir under a reduced pressure of less than $10^{-2}$ mmHg. Then, 2 ml. of a cyclohexane solution containing 0.0036 mole of n-butyllithium was added to the system by means of a syringe through a self-sealing rubber stopper fitted to the reactor. The polymerization of methyl methacrylate was conducted at −40° C. for 15 minutes with stirring by means of a magnetic stirrer. Under these conditions the conversion of methyl methacrylate was 60 percent. Subsequently, dry nitrogen was admitted into the reactor by way of a three-way stopcock attached thereto.

Then, under the nitrogen atmosphere 0.0036 mole of diethylaluminum chloride was added into the reactor, and reaction was allowed to proceed under predetermined conditions: at −40° C. for 15 minutes. Then, 0.0018 mole of titanium tetrachloride was added to the reaction mixture, and ageing of the catalyst was carried out at −40° C. for 10 minutes. The color of the reaction mixture had turned brownish black instantly upon the addition of titanium tetrachloride. Then, 52 ml. of styrene was added to the reaction mixture, and block copolymerization was allowed to proceed under a nitrogen atmosphere at 100° C. for 6.5 hours. After completion of the block copolymerization, the liquid reaction mixture was poured into a large excess of methanol, to recover the polymerizate, which was vacuum-dried to yield 54 g. of a white polymer.

Fractionation of the crude product was effected by extracting polystyrene with boiling ether and polymethyl methacrylate with boiling acetonitrile. 5 Grams of polystyrene and 3.2 grams of polymethyl methacrylate were obtained. Hence, it was found that practically about 90 percent of the product was block copolymer.

What is claimed is:

1. A process for producing a block copolymer which comprises
   1. forming a reaction product consisting of a polymer containing on its chain end a metal-carbon linkage by reacting
      a. a living polymer having an alkali atom bonded to at least one end of the polymer chain with
      b. a metal halide or an organometallic halide represented by the general formula, $$MR_{p-n}X_n$$

wherein M is a metal of Group II or III of Mendeleev's Periodic Table, R is an organic residue having one to 20 carbon atoms, X is a halogen atom, $p$ is the valence of M, and $n$ is an arbitrary number of higher than 0 but lower than 3, so as to replace the alkali atom with the Group II or III metal, and then
      c. a compound of a transition metal of Group IV, V, or VI of Mendeleev's Periodic Table and
   2. block copolymerizing said reaction product with a coordination-anionically polymerizable monomer.

2. A process according to claim 1, wherein the coordination-anionically polymerizable monomer is an ethylenically unsaturated hydrocarbon or a mixture of two or more ethylenically unsaturated hydrocarbons.

3. A process according to claim 2, wherein the ethylenically unsaturated hydrocarbon is a compound of the formula,

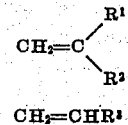

or

wherein $R^1$ is an alkyl radical having one to 15 carbon atoms, $R^2$ is an alkyl radical having one to 15 carbon atoms, a cycloalkyl radical having three to six carbon atoms, an aryl radical having six to 10 carbon atoms, an aralkyl radical having six to 15 carbon atoms, or an alkaryl radical having six to 15 carbon atoms, and $R^3$ is a hydrogen atom, an alkyl radical having one to 15 carbon atoms, a cycloalkyl radical having three to six carbon atoms, an aryl radical having six to 10 carbon atoms, an alkaryl radical having six to 15 carbon atoms or an aralkyl radical having six to 15 carbon atoms.

4. A process according to claim 2, wherein the ethylenically unsaturated hydrocarbon is selected from the group consisting of ethylene, propylene, butene-1, pentene-1, hexene-1, heptene-1, octene-1, isobutene, cis-butene, diisobutene, tert.-butylethylene, 4-methylheptene-1, 5-methylheptene-1 tetramethylethylene, styrene, α-methylstyrene, vinylcyclohexene, hexadiene-1,4, 6-methylheptadiene-1,5, butadiene, isoprene, pentadiene-1,3, cyclopentadiene, cyclohexene, 4-vinylcyclohexene-1 and β-pinene.

5. A process according to claim 1, wherein the living polymer is derived from the group consisting of styrene, α-methylstyrene, vinyltoluene, vinylnaphthalene, 2-vinylpyridine, 4-vinylpyridine, methyl acrylate, ethyl acrylate, methyl methacrylate, ethyl methacrylate, butadiene, isoprene, and a mixture of two or more these compounds.

6. A process according to claim 1, wherein the metal halide or the organometallic halide is a member selected from the group consisting of magnesium chloride, butylmagnesium chloride, phenylmagnesium bromide, dipropylaluminum fluoride, diisobutylaluminum fluoride, aluminum chloride, dimethylaluminum chloride, ethylaluminum dichloride, sesquiethylaluminum chloride, diethylaluminum chloride, dihexylaluminum chloride, and diethylaluminum bromide.

7. A process according to claim 1, wherein the molar ratio of the metal halide or the organometallic halide to one mole of the living polymer is 1.00 to 1.20 for a monohalide, 0.50 to 0.60 for a dihalide, and 0.35 to 0.40 for a trihalide.

8. A process according to claim 1, wherein the living polymer is reacted with the metal halide or the organometallic halide at a temperature within the range of −78° C to the boiling point of the solvent.

9. A process according to claim 1, wherein the compound of the transition metal of Group IV, V or VI of Mendeleev's Periodic Table is a member selected from the group consisting of titanium tetrachloride, titanium trichloride, zirconium tetrachloride, tetrabutyl titanate, vanadium oxyacetylacetonate, and chromium acetalacetonate.

10. A process according to claim 1, wherein the molar ratio of the polymer containing on its chain end a metal-carbon linkage to the compound of the transition metal is from 1 : 1 to 10 : 1.

11. A process according to claim 1, wherein the coordination-anionically polymerizable monomer is contacted with the catalyst at a temperature of −78° to 200°C.

12. A process according to claim 1, wherein the coordination-anionically polymerizable monomer is contacted with the catalyst at a temperature of −20° to 100°C.

13. A process according to claim 1, wherein the coordination-anionically polymerizable monomer is contacted with the catalyst under a pressure within a range from partial vacuum to about 500 atmospheres.

14. A process according to claim 13, wherein the pressure is from atmospheric pressure to 100 atmospheres.

15. A process according to claim 1, wherein the block copolymerization is carried out in the presence of a solvent.

16. A process according to claim 1, wherein the solvent is a member selected from the group consisting of pentane, hexane, cyclohexane, tetrahydronaphthalene, benzene, toluene, xylene, dioxane, tetrahydrofuran, and 1,2-dimethoxyethane.

* * * * *